Aug. 25, 1964         R. F. REIFERS                3,145,895
       HINGE CONSTRUCTION OF MOLDED FIBER ARTICLES
             AND METHOD OF PRODUCING THE SAME
Filed Aug. 16, 1962                        6 Sheets-Sheet 1

INVENTOR
Richard F. Reifers

BY  Karl W. Flocks,
                    ATTORNEY

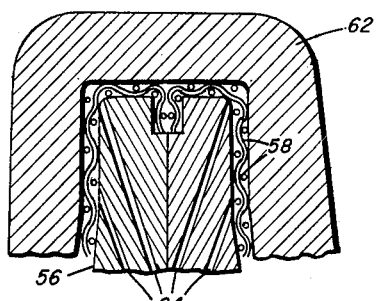
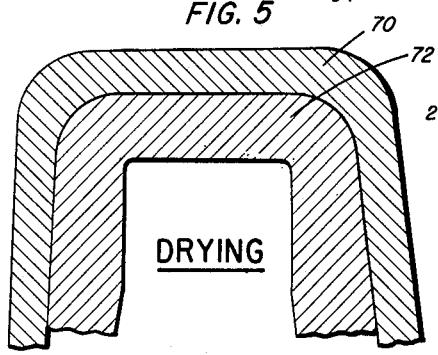
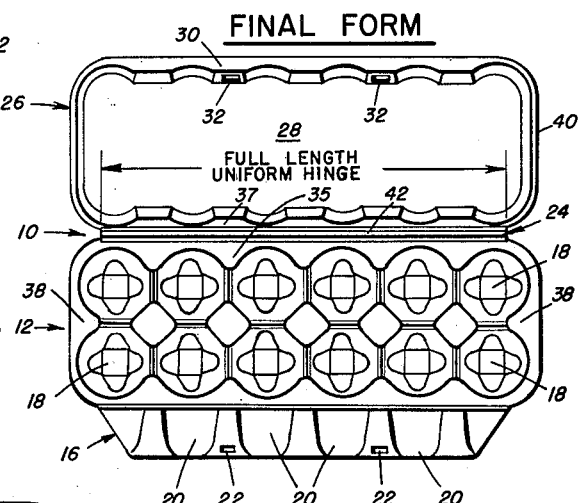
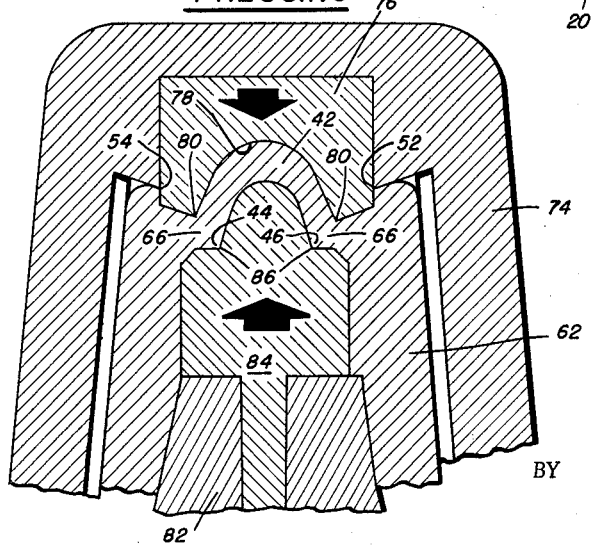

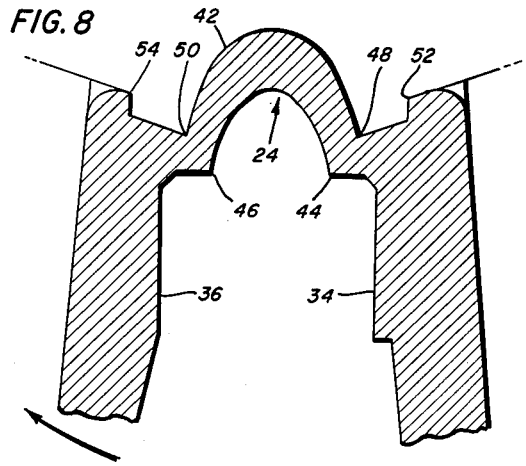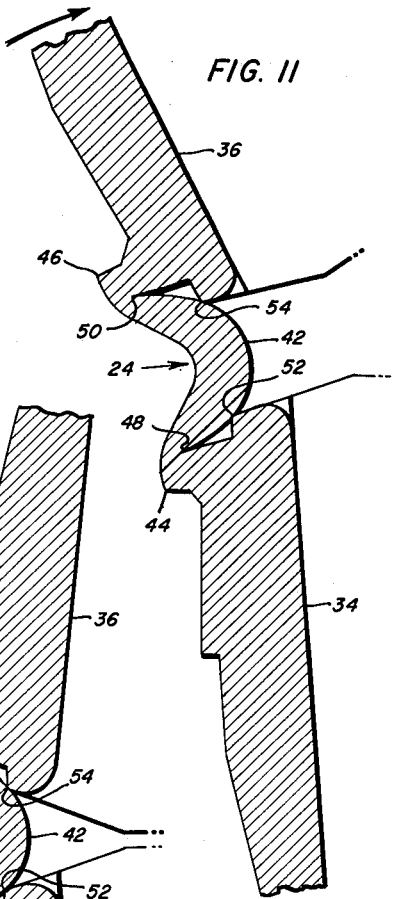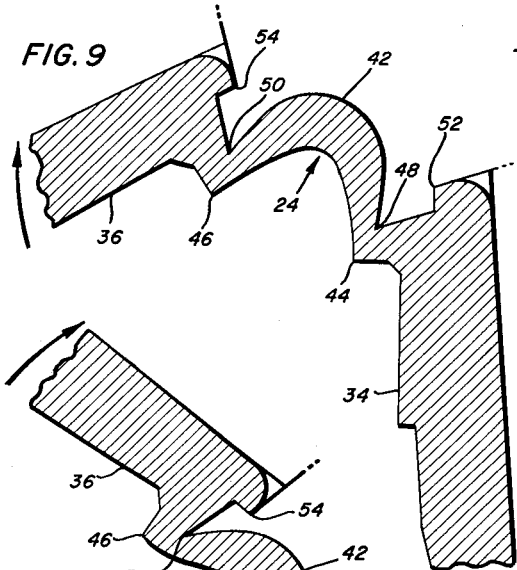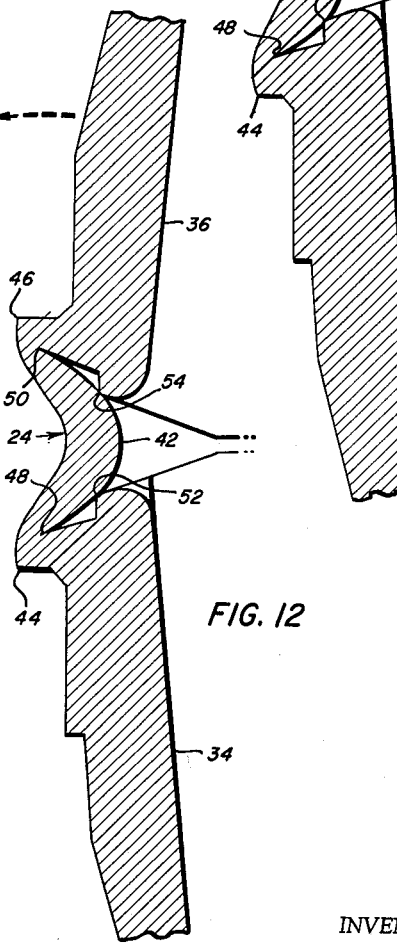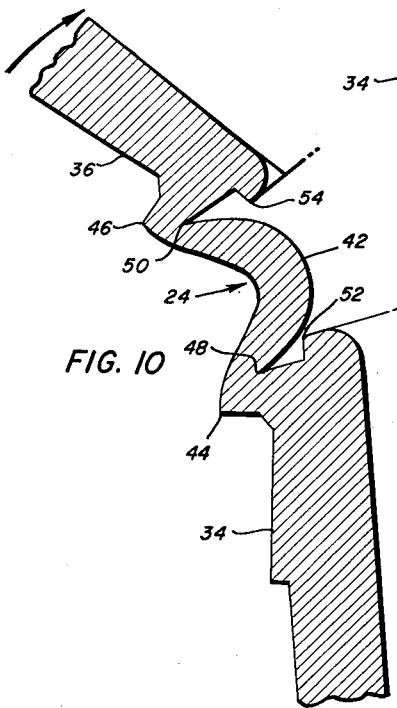

Aug. 25, 1964   R. F. REIFERS   3,145,895
HINGE CONSTRUCTION OF MOLDED FIBER ARTICLES
AND METHOD OF PRODUCING THE SAME
Filed Aug. 16, 1962   6 Sheets-Sheet 4
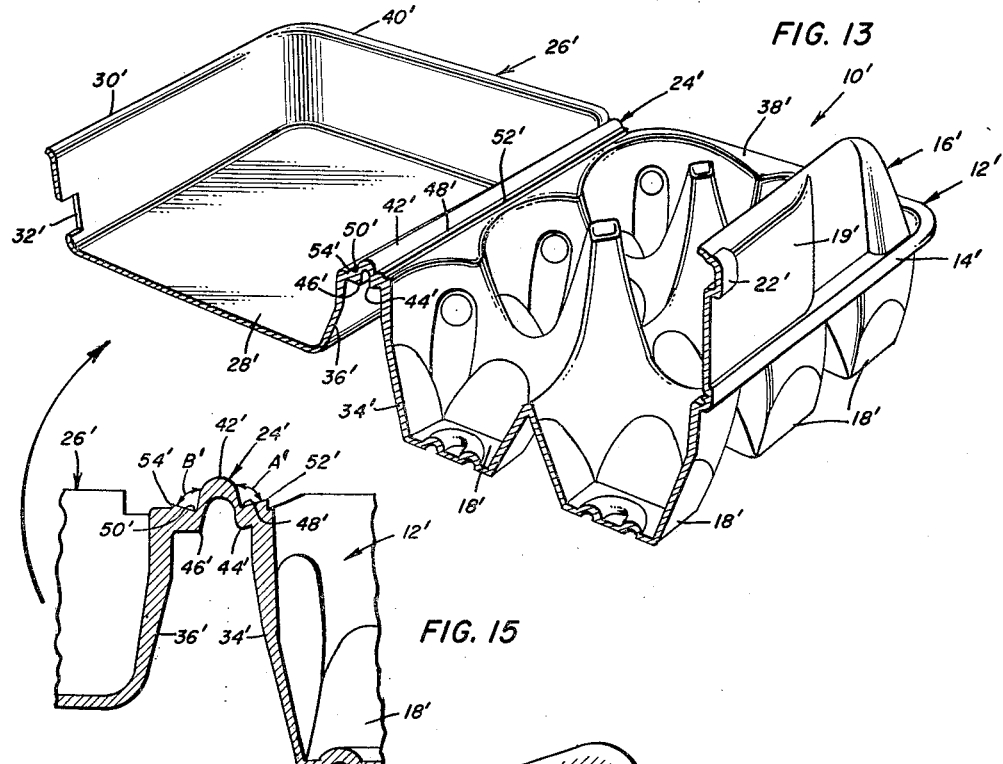
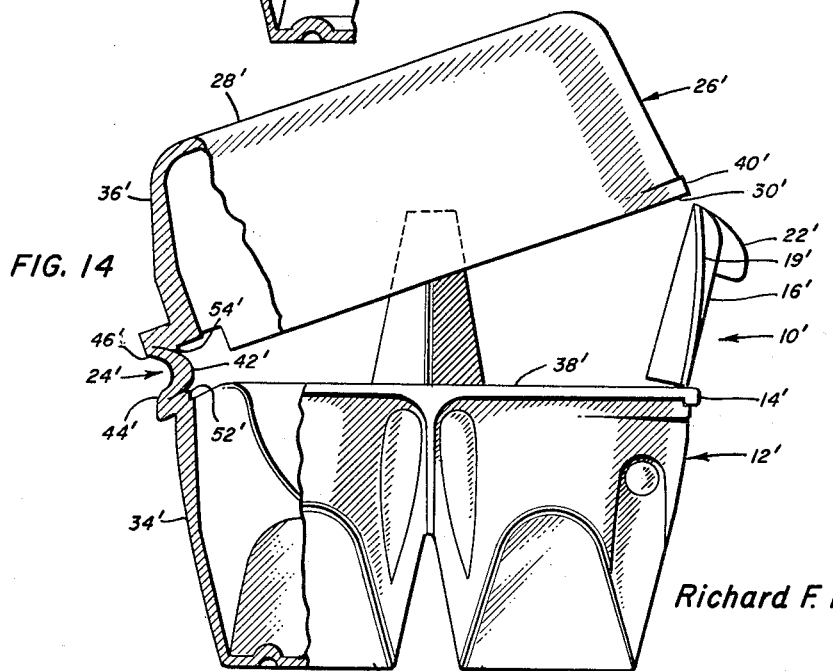
INVENTOR
*Richard F. Reifers*
BY  *Karl W. Flocks*
ATTORNEY INVENTOR
Richard F. Reifers
BY
Karl W. Flocks
ATTORNEY

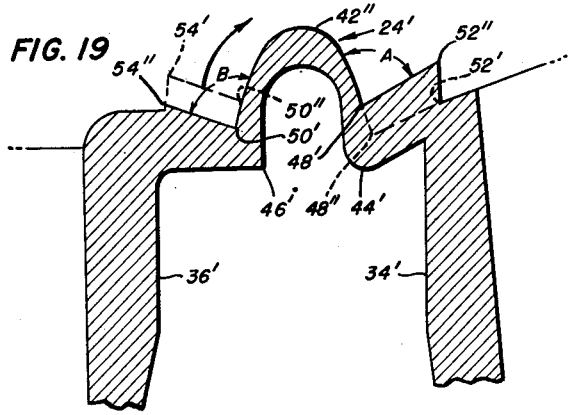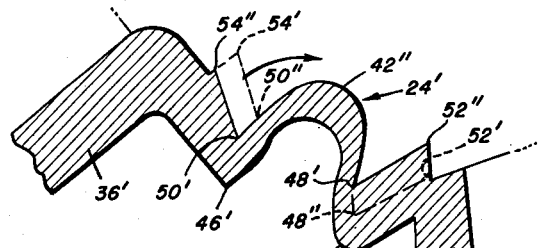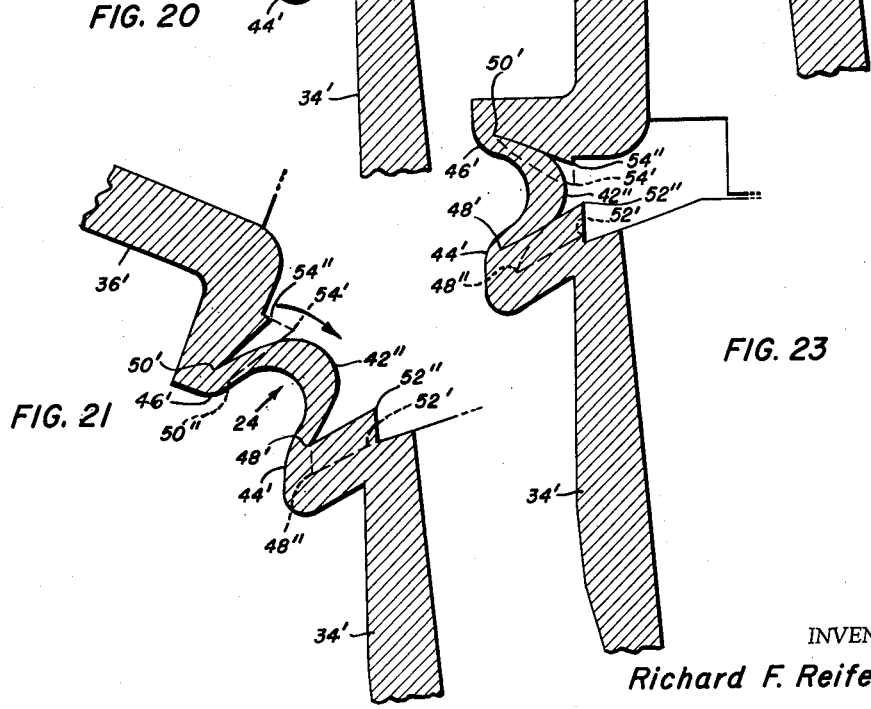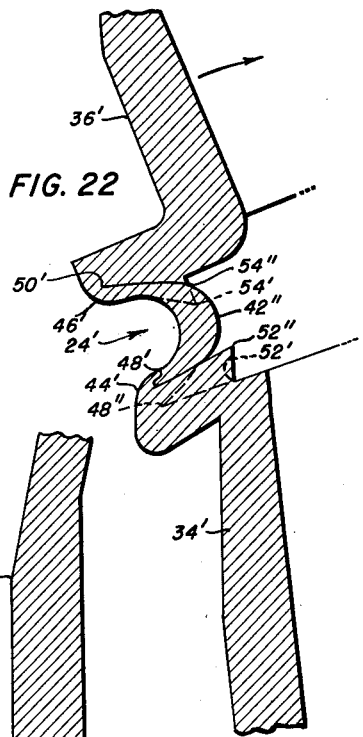

United States Patent Office

3,145,895
Patented Aug. 25, 1964

3,145,895
HINGE CONSTRUCTION OF MOLDED FIBER
ARTICLES AND METHOD OF PRODUCING
THE SAME
Richard F. Reifers, New Canaan, Conn., assignor to Diamond National Corporation, New York, N.Y., a corporation of Delaware
Filed Aug. 16, 1962, Ser. No. 217,379
17 Claims. (Cl. 229—2.5)

This invention relates generally to methods and structure of molded fiber articles, such as egg cartons and the like, and is primarily concerned with a novel method of producing a novel flexible hinge connection especially adapted for use in egg cartons which have a tray and cover normally disposed at 180° with respect to each other, and when the carton is closed the cover will be rotated approximately 180° to lockingly engage a lock flap integral and hingedly connected to the tray.

This type of hinge connection and articles involved are disclosed in U.S. Letters Patent to Chaplin 2,515,113, issued July 11, 1950.

A primary object of the present invention is to provide a novel hinge connection utilizing a novel method wherein distinct controlled pivot points are provided on either side of and along a hinge to provide an optimum closed cover relationship with respect to a bottom tray.

A further object of the invention is to provide a hinge connection by a novel method wherein fiber at the hinge connection, which is normally placed under tension during hinge action is permitted to remain intact with respect to the hinge connection at the outer surface thereof, and fiber which is normally placed under compression is reworked, i.e. severed, reshaped or relieved in order to afford increased flexibility and controlled "throw" of the hinge action without damage to, or loss of, normal function of the hinge connection.

Another object of the invention is to provide a novel hinge construction utilizing a novel method wherein the hinge connection is maintained within permissive exterior dimensional requirements of the closed container and yet is practical and satisfactory for the purpose intended.

A still further object of the invention is to provide a novel hinge construction utilizing a novel method wherein folding points are provided about a flexible U-shaped hinge and wherein the hinge points provide less than 90° of folding at one portion to afford in the finished article counterforce tending to resist accidental opening of a carton or the like without loss of structural strength and/or stable internal geometry to permit vertical loads on the carton to be transmitted through the hinge construction per se.

An yet another object of the present invention is to provide a novel hinge construction for molded pulp articles whereby the hinge provides a tight closure with a cooperating lock flap; a stable internal geometry is provided to attain proper transmittal of vertical forces through the hinge without substantial carton distortion; an internal fiber construction includes relieved portions for promoting easy hinging and retaining necessary strength and affords variable folding action along its length to provide proper alignment of a hinged cover and mating bottom section.

A still further object of the present invention is to provide a novel creasing bar and rule combination for use in preform pressing dies to afford variable and reworked hinge profiles along the length of the hinge connection of a molded pulp article.

Other objects and the nature and advantages of the instant invention will be apparent from the following detailed description, taken in conjunction with the accompanying drawings, wherein:

FIG. 4 is an enlarged fragmentary section of a mold showing the manner in which a layer of pulp is initially deposited to ultimately form a hinge for a molded pulp article;

FIG. 5 is an enlarged section of a drying form used in drying the hinge area illustrated in FIG. 4, the drying form also acting as a transfer die at time of removal from the forming die;

FIG. 6 is an enlarged fragmentary section of reforming dies incorporating a creasing rule and bar for reworking the fibers at one side of the hinge and reworking or modifying the cross sectional shape;

FIG. 7 is a top plan view looking at the inside of the carton of FIGS. 1 and 2;

FIG. 8 is a fragmentary enlarged section illustrating the hinge connection formed by the cooperating reforming die's creasing rule and bar of FIG. 6;

FIG. 9 is a view similar to FIG. 8, showing a pivoted position of the parts at the hinge connection;

FIG. 10 is a view similar to FIGS. 8 and 9, showing a still further pivoted position of the parts as the carton is being closed.

FIG. 11 is similar to FIGS. 8–10 and shows further pivoting of the hinge connection parts when moved toward a closed position;

FIG. 12 illustrates the hinge connection in its closed position;

FIG. 13 is a view similar to FIG. 1 showing another embodiment of egg carton utilizing a modified flexible hinge connection;

FIG. 14 is a view somewhat similar to FIG. 2, showing the carton of FIG. 13 in a substantially closed condition, and illustrating the manner in which a counter-force is provided in the hinge connection to insure proper closure of the carton;

FIG. 15 is a view similar to FIG. 3 illustrating the hinge connection in an open condition;

FIG. 19 is a view similar to FIGS. 8 and 17 showing the position of the end hinge portions of a normally open carton, and showing in phantom lines the relative position of the central hinge portion superimposed thereon;

FIG. 20 is a view similar to FIG. 9 illustrating an initial pivotal movement of the cooperating parts of the hinge connection;

FIG. 21 is a view similar to FIG. 10 illustrating further pivoting of the parts of the flexible hinge connection;

FIG. 22 is a view similar to FIG. 11, illustrating the manner in which the flexible hinge connection has inherently formed therein a counter-force to be overcome when the carton is closed; and FIG. 23 is a view similar to FIG. 12 illustrating the position of the parts when the carton is closed.

Figure 1:
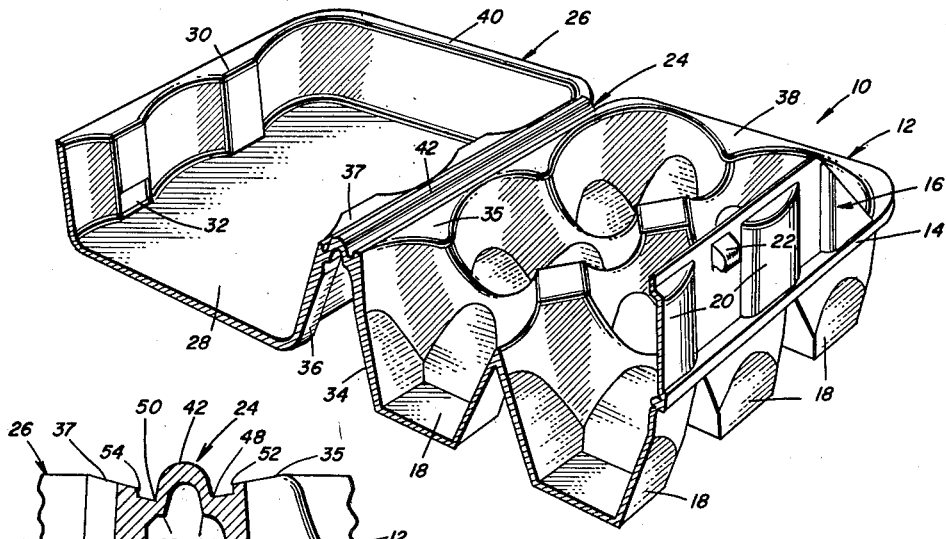
FIG. 1 is a fragmentary perspective view of an egg tray incorporating the invention, portions being broken away and shown in section for purposes of clarity.

Referring to FIGS. 1–12, a molded pulp egg carton is indicated generally at 10 and comprises a bottom tray 12, hingedly connected at its forward edge 14 to a lock flap 16. The bottom tray 12 includes a plurality of adjacent cells 18 divided by vertically projecting posts and saddle portions, as is typical in the art.

The lock flap 16 includes bay portions 20 having disposed therebetween laterally projecting lock lugs 22. This structure is disclosed and described in detail in United States Letters Patent to Reifers 2,990,094 issued June 27, 1961.

The tray 12 has hingedly connected at a flexible hinge connection indicated generally at 24 a cover member 26 which includes a flat top 28 and scalloped forward edge 30 including aperture portions 32 cooperating with the lock lugs 22.

The particular structure involved in this application concerns that of the flexible hinge connection 24 disposed between the back wall 34 of the bottom tray 12 and the back wall 36 of the cover member 26.

The back walls 34 and 36 of the bottom tray 12 and cover member 26 respectively include scalloped portions forming abutments 35 and 37 which will be engaged when the carton is closed to stabilize and transmit vertical load through the carton.

The normal open position of the parts will be that illustrated in FIG. 1 and when the cover is disposed on the bottom tray 12, and the carton is closed, vertical forces will be transmitted between the peripheral flange 38 of the bottom tray member and the peripheral flange 40 of the cover member 26. The abutments 35 and 37 will be engaged and the hinge will not be required to transmit vertical load.

Figure 3:
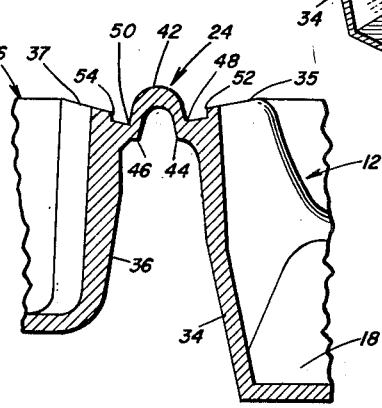
FIG. 3 is an enlarged fragmentary elevation of the hinge connection portion of the carton shown in FIG. 1.
Figure 2:
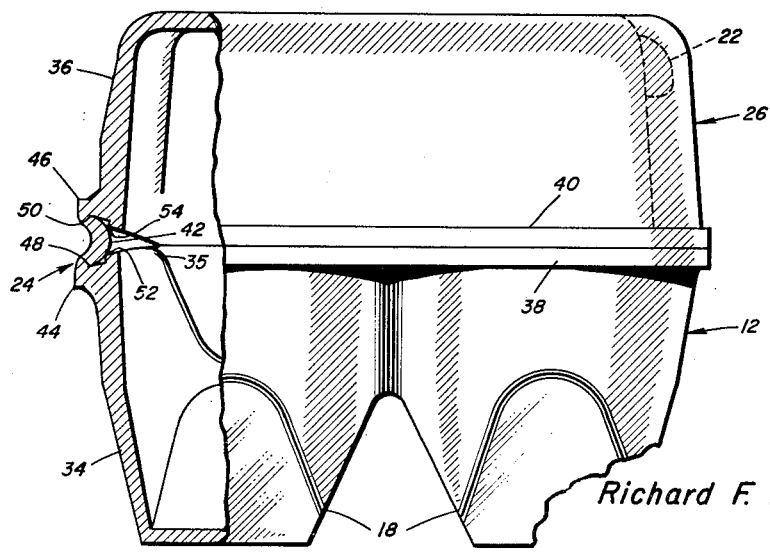
FIG. 2 is an end view of the egg tray of FIG. 1, showing the cover in a closed position with respect to the lower tray portion, portions being broken away for the purpose of illustrating the hinge connection.

As seen in FIG. 3, the flexible hinge connection 24 comprises a longitudinally extending protrusion or U-shaped rib 42 having disposed at opposite edges thereof hinge points 44 and 46, and as will subsequently be described in detail, the fiber deposited at the hinge points 44 and 46 will generally extend transversely or parallel to the hinging movement thereof, and the hinge can be continuous (i.e. along the entire length of the articles) or a plurality of longitudinally spaced or interrupted hinge segments can be provided. The opposite side of the U-shaped portion, whether continuous or interrupted, as indicated at 48 and 50 respectively, will have fiber which will be reworked, i.e. severed, reshaped or relieved. When the cover member 24 is in the closed position shown in FIG. 2, the hinge points at 44 and 46 will be placed under tension, whereas the portions 48 and 50 will be under compression and the fibers will be reworked or softened to provide a suitable flexible hinge. Additionally, portions 52 and 54 of the rear wall 34 of the tray member and the rear wall 36 of the cover member, respectively, will abuttingly engage the inner surface of the U-shaped portion 42 to provide good transmittal of force or internal geometry to the flexible hinge connection.

The manner in which the controlled fiber rupture or crease is obtained at the flexible hinge connection 24 is clearly illustrated in FIGS. 4–6.

In FIG. 4, a fragmentary portion of a die for forming the initial pulp preform at the flexible hinge connection to be ultimately formed is indicated at 56 and includes a wire screen 58 covering the outer surface thereof. A layer of fiber 62 will build up on the outer surface of the screen 58 as indicated when suction is applied at the die orifices or passages 64.

In FIG. 5 a drying form (which may be used as a transfer means) 70 conforms to the outer surface 72 of the layer of pulp 62 which will form the flexible hinge connection. The layer of pulp is substantially dried at this stage.

Considering FIG. 6, the layer of pulp 62 is pressed between mating pressing dies which incorporate a creasing bar 76 and creasing rule 84. The creasing bar 76 includes a central groove 78 for ultimately receiving the portion 42 of the hinge therein. The blade edges 80 will crease or reset the normally oriented fiber 66 on the inner surface of the hinge 24 for relieving internal stresses opposite the hinge points 44 and 46. The fibers at 66 will become soft and pliable to afford good hinge action, i.e. similar to the manner in which wool fabric is steamed and pressed.

The creasing rule 84 has a T-shaped cross section which compresses the fiber at 86 and the entire projecting surface thereabove; however, the fiber is not ruptured. The non-severed fiber is softened when pressed; however, the outer surface of hinge connection will be constituted as an uninterrupted "skin" which will be placed under tension when the hinge moves through the positions shown in FIGS. 8–12. The pressing and softening provides a good "hinge-flex" action yet maintains a substantial "skin control effect" at the surface engaged by the outer surface of rule 84.

Considering FIG. 7, the hinge 24 will extend substantially the full length of the cover 26 and the hinge will have a uniform cross section throughout its length. The nose of the creasing rule 84 will drive a mass of fiber into the groove of the creasing rule and the fiber is ruptured at the side of the pulp layer opposite the blade nose. Rupture of the fiber at this inner surface of the fold locations improves flexibility of the hinge, i.e. the cover member will readily pivot, yet the external surface remains substantially continuous without fiber rupture or damage.

The abutment portions formed by the scallops 35, 37 transmit vertical load although the hinge is essentially non-load bearing. The double fold on hinge points provides a minimum projection at the back edge of the cartons affording minimum width for the finished cartons when they are closed.

It will be noted in FIG. 3 that the abutment points 52 and 54 are formed at the hinge connection. The hinge connection shown in FIG. 6 illustrates the normal condition thereof as shown in FIG. 3 and FIG. 8, for example.

Comparing FIGS. 8 and 9, it will be noted, upon initial pivoting of the back wall 36 of the cover, that abutment points 52 and 54 are now close to the elongated bead or U-shaped rib 42 of the flexible hinge.

As the distance between the abutment points 52 and 54 is decreased due to the raising of the cover rear wall 36, relatively easy or free hinging will occur in view of the fact that the fiber has been relieved as well as creased and reshaped at 48 and 50. However, the fiber deposited at 44 and 46 is now being placed under tension. Continued rotation of the cover, as indicated in FIG. 10, increases the tension at 44 and 46 and the compression of the fibers at 48 and 50, and the abutment portions 52 and 54 are now still closer to the rib 42. Considering FIG. 11, this is the position when the cover is substantially closed. At this time, the abutment points 52 and 54 engage the rib 42, and continued rotation of the cover, as indicated by the arcuate direction arrow in FIG. 11, causes slight distortion or counter-force adjacent the hinge 24 which will tend to pull the cover front wall 30 onto or into tight locking engagement with lock flap 16 when the carton is ultimately closed, this counter-force being indicated by a dotted direction arrow in FIG. 12.

Referring to FIGS. 13–23, and first considering FIGS. 13–16, another embodiment of the flexible hinge connection will be disclosed, this embodiment further emphasizing the manner in which a "counter-force" can be controlled in the production of molded pulp articles of the character involved.

An egg carton different from that disclosed in FIG. 1 is indicated generally at 10′ in FIG. 13 and comprises a bottom or tray member indicated generally at 12′ including at a forward hinge connection 14′ and a lock flap 16′. The carton or tray bottom 12′ includes a plurality of adjacent spaced cells 18′, and incorporated on bay portions 19' of the lock flap 16' are forwardly extending lug elements or embossments 22'. The bottom or tray member 12' has integrally formed therewith, at the rear edge, a flexible hinge connection indicated generally at 24' for attaching to the tray a cover or lid member indicated generally at 26'. The lid or cover member 26' includes a flat top 28', a forward angular wall having a lower abutment lip 30' for engaging the upper surface at the hinge connection 14', and suitable apertures 32' for engaging the lock lugs or embossments 22'.

The flexible hinge connection 24' is disposed between the rear walls 34' and 36' of the bottom or tray member 12' and cover member 26', respectively. When the carton is closed, the peripheral abutment flange 38' of the bottom or tray member 12' will have juxtaposed thereon the peripheral flange 40' of the cover member 26'.

The cells 18' of the carton 10' are separated by suitable saddle portions and a plurality of vertically extending support posts which extend above flange 38' will terminally engage the under surface of the flat top 28' of the cover member 26' when the carton is closed.

Before describing the hinge construction 24' in detail, it will be readily apparent that the cover member 26' is essentially a tray with uninterrupted side portions, and in a sense does not have the structural rigidity of the previously described embodiment. The relatively tall central support posts of this carton will transfer or absorb considerable vertical loading to the closed carton, however, the hinge 24' will be essentially load bearing.

When this carton is vertically loaded, and in the absence of the novel hinge construction to subsequently be described in detail, the cover may have a tendency to "unroll" at its structural hinge outwardly and downwardly, thus imposing instability in the finished carton. This tendency of the carton cover member to roll at the structural hinge can be compensated for. However, if the compensation should occur along the entire length of the hinge, the forward wall 30' would be disposed or lean too far forward, and this would be an undesirable quality in the finished carton.

In order to afford positive and substantially optimum orientation with respect to abutting tray member and lid member flanges, and to afford the proper vertical loading on the carton, the novel hinge 24' will incorporate different cross sections along its length which substantially assures proper structural load transmittal through the hinge, and wherein the hinge has an internal stable geometry which permits vertical or structural loading.

The novel hinge construction of this embodiment of the carton is essentially formed in the manner explained in detail with respect to FIGS. 4–6 pertaining to the previously described embodiment.

Figure 16:
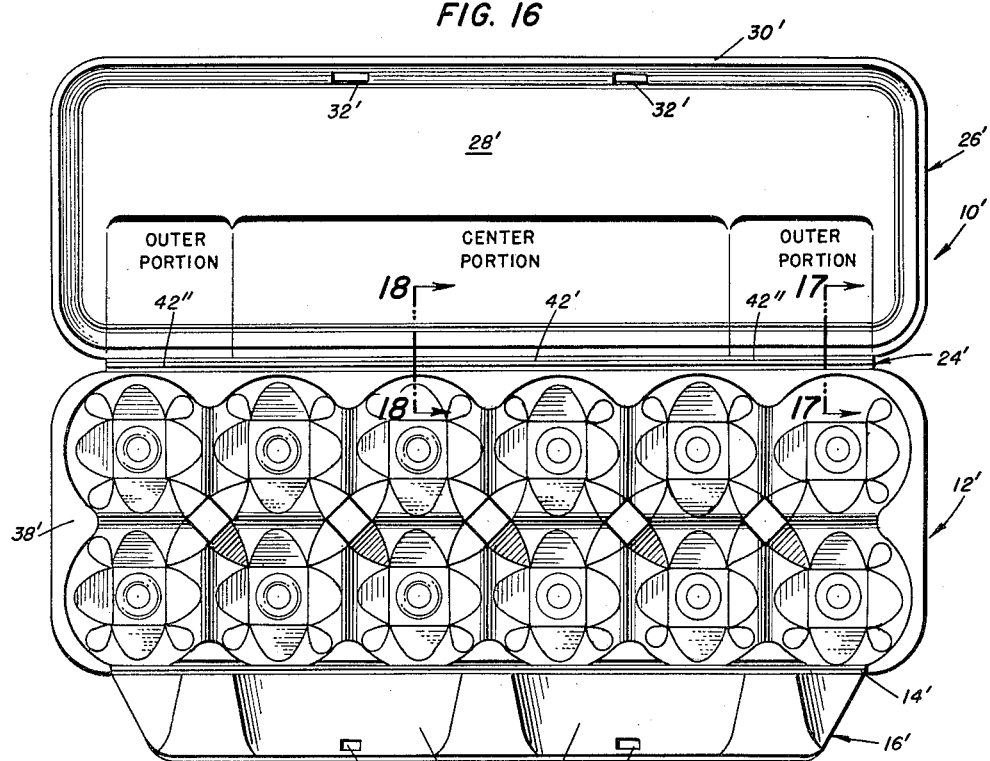
FIG. 16 is a top plan view looking inside the carton of FIGS. 13 and 14, indicating diagrammatically how the hinge cross section may be varied in order to control the oriented relationship between mating portions of the lid and tray member.
Figure 17:
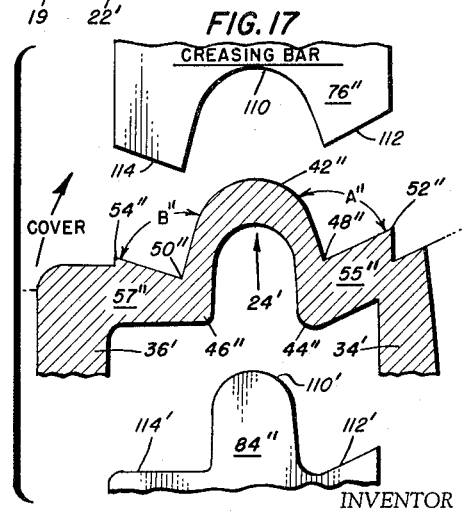
FIG. 17 is an enlarged vertical section taken substantially on the plane of line 17—17 of FIG. 16, showing the configuration of the creasing bar and rule at outer hinge portions.

Referring to FIGS. 16 and 17, the outer portions of the flexible hinge 24' include a U-shaped bead or rib 42" having, formed at opposite sides thereof, hinge points 44" and 46" in opposed relation to either relieved or severed portions 48" and 50" respectively. Additionally, the outer flexible hinge portions include abutment portions 52" and 54" similar in character to the abutment portions at the central portion of the hinge.

In the outer hinge portions or areas, the included angle A" between the hinge rib 42" and the surface terminating at the abutment 52" can be controlled with respect to the included angle B" between the hinge rib 42" and abutment point 54" to accordingly control the "throw" or built-in "counter-force" along the flexible hinge 24'.

As will subsequently be described in detail, and as will be observed when considering FIGS. 19–23, the central hinge portion will have different pivoting characteristics when compared with the pivoting or hinge characteristics of the outer hinge portions conveniently indicated at 42".

Figure 18:
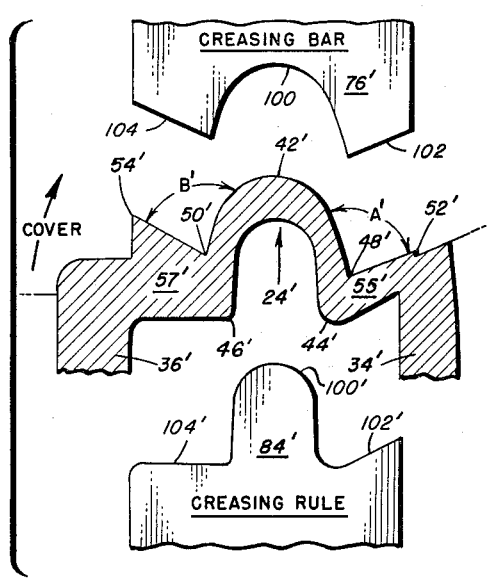
FIG. 18 is an enlarged vertical section taken substantially on the plane of line 18—18 of FIG. 16, showing the configuration of the creasing bar and rule at the central hinge portion.

Considering FIG. 18, it will be noted that this section is taken to the central portion of the hinge 24', and includes a rib portion 42' having on opposite sides thereof hinge points 44' and 46' in opposed relation to relieved fiber portions 48' and 50', respectively. This central hinge portion includes abutment portions 52', 54' and it will be noted that the included angle A' is different than the included angle B'. Further, it will be noted that the fiber construction or thickness adjacent to hinge point 44" and relieved fiber portion 48" as indicated at 55 is relatively thicker than the comparable portion 55' at the central portion of the hinge 24'. Likewise, the thickness of the fiber at 57 adjacent the relieved portion 50" and hinge point 46", is thinner than the analogous portion 57' at the central portion of the hinge 24'.

Fragmentary portions of the creasing rule indicated at 84' and creasing bar 76' for forming the central hinge portion 42', may be compared with respect to the creasing rule 84" and creasing bar 76". The creasing rule and bar profiles 84', 84" and 76', 76", respectively, it will be understood, are on a single element, the profile being varied along the length to afford the different hinge cross sections 42' and 42" at the inner and two outer end portions of the hinge 24'.

The creasing bar 76' (see FIG. 18 showing a typical central hinge cross section) includes a female slot 100 which is bordered at opposite sides by angularly disposed, diverging shoulder portions 102 and 104. The creasing rule 84' includes a male nose portion 100' having at the base portion thereof angular shoulders 102' and 104'.

Considering FIG. 17, the creasing bar includes at 76", i.e. outboard of the central section, a female slot 110 and angular, diverging shoulders 112 and 114. The creasing rule 84" included a hose portion 110' and angular shoulders 112' and 114'.

The variation on the angular relations between the shoulders 102, 104 and 112, 114, bearing in mind that this is a single integral rule, affords along the length of the hinge cross sections 42', 42" different hinging function accordingly obtaining optimum orientation between the abutting portions of a hinged carton lid and bottom section.

The variable hinge cross sections of the disclosed hinge connection, in addition to the reworking and reshaping of the pulp fiber thereat, affords effective and practical controlled hinging.

By use of variants in fiber thicknesses 55', 55" and 57', 57" in addition to changing the angles A', A" and B', B", it is possible to control the internal geometry and orientation of the cover member with respect to the tray structure of the molded carton. Although the carton hinge is relieved on the inner surface which is generally subjected to compression, the outer fibers constitute a substantially continuous "skin" when placed under tension. By varying the thicknesses adjacent the hinge points, it is possible to alter the roll or forward movement of the forward wall of the cover so that an especially good tight seal is obtained with the lock flap 16', and when the carton is opened, the cover member will in effect "pop" upwardly to open the carton and to permit ready access to the contents therein.

Considering FIGS. 19–23, comparable to FIGS. 8–12, the parts are initially disposed in the position shown in FIG. 19. Pivoting of the carton cover 26' i.e. back wall 36', initially causes tension at the hinge points 44' and 46'. It will be noted that the under surface of the hinge portions 42' and 42" are substantially identical when comparing FIGS. 17 and 18. However, as observed in FIGS. 19–23, which is a section in solid lines through the outer hinge portion 42", there has been superimposed thereon by means of phantom lines the approximate positions of analogous portions of the center hinge portion 42'.

Continued clockwise movement of the back wall 36' from the position shown in FIG. 19 to FIG. 20 results in closing of the angle between adjacent surfaces of the transverse rib 42" and abutment points 52" and 54". Thus the angles A', A" and B', B" will be changing, however, the angular differences will result in earlier or later abutting engagement between the outer and center hinge portions. Accordingly, it is possible to impose a variable tension along the length or rear surface of the hinge or hinge axis of the cover as it is being closed. This control feature is especially adapted for a molded pulp hinge which will be load bearing and accordingly this hinge will be quite stable and capable of transmitting vertical loading on the cover member.

Considering FIGS. 21 and 22, additional pivoting steps are shown wherein the angles A', A" and B', B" become less and less until the hinge assumes the condition shown in FIG. 22, this being the position in which the carton cover or lid is not yet in a closed position with respect to the lock flap 16'. Continued pivoting of the wall 36' orients the forward or front wall of the lid or cover member onto the lock flap 16'.

The function of the controlled "throw" of the cover of the carton may be described in another manner. Attention is particularly directed to FIGS. 17 and 18 taken on lines 17—17 and 18—18 of FIG. 16, i.e. on the hinge at the respective outer and center portions thereof, and FIGS. 19–23 showing the relative position of the parts when the carton is closed. The section 55 in FIG. 17 is thicker than the comparable section 55' of FIG. 18. Likewise, the section 57 is thinner than the section 57' when comparing FIGS. 17 and 18, respectively. Thus, if a hinge were constructed with a uniform cross section similar to that of FIG. 17, and since section 55 is thicker than section 57, portion 36', i.e. the cover, will have relatively freer hinge movement at point 46' and 50' as compared with point 44" and 48". In view of the substantial reversal of the thickness of the portions 55' and 57' of FIG. 18 as compared with FIG. 17, the opposite function would occur, i.e. the hinge would tend to be freer at hinge portions 44', 48' as compared with 46', 50'.

When these two cross sections are incorporated or integrated along the length of a single hinge, the following functions will occur: FIGS. 19–23, when portion 36' is pivoted from the position shown in FIG. 19 to the position shown in FIG. 20, the center portion of the hinge, i.e. will have free movement at hinge portions 44', 48' as compared with the relatively thicker portions 46', 50'. However, the outer hinge portions comparable to FIG. 17 and the section shown in solid lines in FIGS. 19 and 20, will have the freer movement adjacent the cover, i.e. hinge portions 46", 50" as compared with the relatively thicker sections at 44", 48".

Further, observing the progressive hinge movements from FIGS. 20 to 22, the portion 54' shown by phantom lines in FIG. 21 will have engaged the protruding rib before 54" has engaged the rib. Likewise, 52" will engage the adjacent portions of the rib before the corresponding portion 52' engages the same. In a sense, the center portion of the hinge as illustrated in FIG. 16 has hinging characteristics substantially opposite those of the outer portion of the hinge. The outer portions illustrated by the section of FIG. 17, result in a substantial resistance of pivotal movement from the position shown in FIG. 22 to that of FIG. 23 wherein the thinner section at 55' illustrated by the section in FIG. 18, will in a sense permit ready pivotal movement during the final closing of the carton.

Due to the illustrated variations of hinge thicknesses along the length, it is possible to build in a portion of a carton resistance to closing of the carton adjacent the outer portions of the hinge while permitting relatively free hinge movement at the center of the hinge construction. This is desirable, since in the illustrated embodiment, it is desirable to tend to pull the lid onto the lock flap 16', and it is also desirable to maintain the bottom section and cover rear walls 34', 36' to substantial vertical alignment to provide a good transmittal of vertical forces from the closed carton lid.

The illustrated embodiment will permit relatively free pivotal or hinge movement in the center portion of the hinge construction during final closing of the carton, and the outer portions of this hinge will more or less resist hinged movement during the final closing. It is clearly evident to those skilled in the art, that if the lock buttons 22' on the lock flap 16' were relocated, or a single lock button were provided, it might be desirable to reverse the cross sections illustrated in FIGS. 17 and 18 so that the center portion of the hinge has a configuration such as that shown in FIG. 17, and the outer portions would have a cross sectional configuration comparable to that in FIG. 18. If this were done, the outer portions of the hinge would have relatively free movement during final closing of the carton, wherein the center portion would resist the final closing of the carton. This control of the final closing of the carton, or free hinged movement or resistance to hinging movement, is accomplished through variations of the thickness of material adjacent the protrusions 42' and 42" with respect to those portions which will engage the outer surface of the protrusions.

The continuous fibers at the hinge points 44', 44" and 46', 46", and the relief, reshaping, creasing or severing of the fibers on the inner surface of the flexible hinge permits subsequent reuse of the carton and provides a desirable and flexible hinge connection. Still further, the hinge will be disposed substantially adjacent to vertical plane passing through the walls 34', 36' when the carton is closed, and provides a substantial abutment surface for transmitting vertical loads therethrough.

When comparing this embodiment with that previously disclosed, the absence of the abutment scallops on the cover member must be compensated for, and the variance of the hinge cross section between the central and outer portions will compensate for the extra pulp and structure which was required to transmit vertical forces through the rear carton walls.

In review, the novel hinge connection of each of the embodiments comprises two distinct pivot points on either side of the center line providing two substantially 90° folds on opposite sides of the ribs which have a substantially U-shaped cross section at the rear side of the molded pulp carton when the same is closed. The hinge connections of each of the embodiments is so formed that the fiber pulp slurry is laid transversely at the hinge connection and is permitted to remain intact or continuous at the outer surface of the hinge points, but is relieved, creased, reset or severed at the inner surface of the flexible hinge points to facilitate and obviate internal stresses in the hinge connection. Still further, the hinge does not interfere with maximum permissible outer dimensions, and provides means for readily and efficiently transmitting vertical loading on the closed carton. Still further, it is possible to design the "throw" of the hinge in order to insure that internal counter force is provided in the closed carton, and it is possible to control the "throw" characteristics along the hinge length to insure proper and optimum orientation between the lid and tray portion of the carton when the carton is closed to prevent unrolling and displacement of the lid or cover member from the tray member of the carton.

Although in the preferred embodiment of creasing bar and rule, variations are illustrated in FIGS. 16–17 for the purpose of obtaining certain and different hinge connection profiles along the length thereof, this invention contemplates that the profile variations may be incorporated in either or both the male or female blade portions, and the illustrated preferred embodiment is shown by way of illustration rather than any inferred or implied limitation.

It will be obvious to those skilled in the art that various changes may be made without departing from the scope of the invention and therefore the invention is not limited to what is shown in the drawings and described in the specification but only as indicated in the appended claims.

What is claimed is:
1. The method of forming a hinge construction between the lid and bottom section walls of an article comprising:
   (a) forming from a liquid fiber mixture a layer of fiber extending transversely between a pair of depending walls of a bottom and lid section of an article and between which the hinge construction will extend transversely when the article is opened; and
   (b) forming a protuberance projecting out of the inner surface of said layer of fiber and away from said pair of depending walls and with a pair of spaced hinged points generally at the base of the protuberance and with abutment portions disposed outwardly and above said hinge points by compressing said layer of fiber and disturbing the fibers at the inner surface of said hinge points and retaining substantially intact the fibers at the outer surface of said hinge points whereby pivoting of said lid wall with respect to said bottom section wall at said hinge points results in engagement of said abutment portions on intermediate portions of said protuberance prior to the closing of said lid and causing the fibers in the outer surface of said hinge construction to be placed under tension.
2. The method of claim 1 including:
   (a) forming said abutment portions at opposite sides of said protuberant portion at different angular relationships with respect to said protuberant portion and said hinge point for controlling the amount of "throw" afforded by the hinge points of said hinge connection in the finished article.
3. The method of claim 2 including:
   (b) forming an angular relationship between the protuberant portion of the finished article and adjacent abutment portions which is less than 180° when the lid is opened 180° for imposing a counterforce in the finished article to insure positive locking of an article in which the hinge connection is formed.
4. The method of claim 1 including:
   (c) forming different hinge cross sections along the length of said hinge construction to obtain different stresses along the length of the hinge connection.
5. The method of claim 4 including:
   (d) locating said abutment portions at oposite sides of the protuberant portion in different angular relationships with respect to said hinge points and the portions of said protuberant portion engageable by said abutment portions when said lid is in closed relationship on said bottom section for controlling the amount of "throw" afforded by the hinge connection, and varying the angular relationship of said abutment portions, hinge points and adjacent portion of said protuberant section in relation to the variance in the hinge cross section to afford control of the hinge action along the length thereof.
6. The method of claim 5 including:
   (e) varying the fiber thickness along the hinge length to impose varying degrees of internal tension and compression therealong.
7. The method of claim 1 including:
   (c) forming said hinge connection by using juxtapositionable creasing rule and bar means having portions for reworking the hinge connection.
8. The method of claim 7 including:
   (d) forming said hinge connection by using a creasing rule and bar in which the cross-sectional profile of at least one of said creasing rule and bar means varies along its length for obtaining different hinge "throw" characteristics in the hinge connection.
9. In a molded fiber carton comprising a bottom tray, a lock flap hinged to one edge of the bottom tray, and a cover hingedly connected to said bottom tray and detachably engageable over said lock flap; the improvement comprising a hinge connection between said bottom tray and said cover, said hinge connection having a protuberance extending away from said tray and cover when the carton is opened and including a pair of hinge points generally at the base of the protuberance and a pair of abutment portions disposed above and outwardly from said hinge points and outer surface of said protuberance whereby the angles between the protuberance and a line drawn from said abutment portions to said hinge points on one side; and between the protuberance and a line drawn from the hinge point and abutment portion on the other side, are such that the abutment portions contact adjacent surfaces of the protuberance before the lid is completely closed thereby causing exterior surface pulp fibers to be placed under tension when said cover is disposed in a closing position on said bottom tray.
10. In a molded fiber carton as set forth in claim 9, said protuberance comprises a U-shaped rib connected to said tray and cover by said two hinge points, said hinge points comprising reworked fiber at one surface of the hinge connection and generally continuous fiber disposed at the other side of said hinge connection when the hinge connection is rotated.
11. In a molded pulp carton as set forth in claim 9, said hinge connection having varying cross sections along its length to insure positive orientation of said bottom tray and cover to insure vertical load transmittal through said hinge connection.
12. In a molded pulp carton as set forth in claim 10 in which said cover consists of a planar top and uninterrupted, marginal sides, said bottom tray including vertical support posts terminally engageable with said planar top.
13. In a molded fiber carton as set forth in claim 11, said protuberance comprises a U-shaped rib connected to said tray and cover by said two hinge points, said hinge points including a substantial continuous fiber skin at the exterior surface thereof and relieved fiber at the interior surface thereof.
14. In a molded pulp carton as set forth in claim 12, said hinge connection having intermittent varying cross sections along its length to control orientation of said bottom tray and cover and compensate for vertical load transmittal through said hinge connection.
15. For use in a pair of juxtapositionable pressing dies for reworking a molded pulp article including a hinge connection between a bottom and lid section, the improvement comprising an elongated creasing rule and creasing bar having substantially mating transverse sections for reworking hinge connection preform fiber portions therebetween, at least one of said creasing rule and creasing bar having a variable cross section along its length to alter the "throw" characteristics along the length of the hinge connection formed thereby.
16. The structure of claim 15 wherein said creasing bar comprises a female slot bordered at opposite sides by angularly disposed shoulders, said creasing rule comprising a male nose portion bordered at opposite base portions by angular shoulders.
17. The structure of claim 16 wherein the shoulders adjacent said female slot diverge from each other at the terminal ends of said slot, one of the shoulders at said male nose base portion extending substantially parallel to one shoulder on said creasing bar, the other shoulder on said rule extending substantially at right angles from said male nose portion base.

References Cited in the file of this patent
UNITED STATES PATENTS

| 2,515,113 | Chaplin | July 11, 1950 |
| 3,082,903 | Stevens et al. | Mar. 26, 1963 |